Patented Apr. 20, 1937

2,078,170

UNITED STATES PATENT OFFICE 2,078,170

INK

Melville M. Wilson, Chicago, Ill.

No Drawing. Application December 14, 1934, Serial No. 757,455

3 Claims. (Cl. 134—35)

The present invention relates to novel printing ink compositions and to the use of a new class of solvents in the manufacture of inks. The purpose of the invention has been to produce a new class of inks incorporating as a major ingredient a solvent having a high solvent power for the binders, gums and resins ordinarily used in inks, low surface tension, low viscosity at ordinary temperatures, and a boiling range sufficiently high to avoid undue loss by evaporation prior to use but low enough to enable drying to take place with reasonable rapidity after application of the ink to the printed surface. The invention rests upon the discovery that the various alkyl substituted benzenes and naphthalenes having boiling points between 180° C. and 350° C. fulfill all of the above requirements to an unusual degree. Examples of compounds which are useful in the practice of the invention are alkyl benzenes having from four to ten carbon atoms in their alkyl side chains, alkyl naphthalenes having from 1 to 6 carbon atoms in their alkyl side chains, dialkyl benzenes having from two to ten carbon atoms in each of their alkyl side chains, dialkyl naphthalenes having from one to five carbon atoms in each of their alkyl side chains, trialkyl benzenes having from two to six carbon atoms in each of their alkyl side chains and other analogous compounds or mixtures of compounds falling within the boiling range discussed above. When a compound of this class is blended with the binders, gums, resins, pigments or dyes, and/or other ingredients ordinarily incorporated in printing inks, a product is produced which is highly satisfactory from the standpoint of homogeneity, surface tension, evaporation rate and other characteristics.

The following examples are illustrative of printing ink compositions which may be prepared in accordance with the invention, it being understood that the term "substituted benzene" as used in the examples is intended to include any of the alkyl substituted benzenes or naphthalenes discussed above.

Example 1

| | Parts |
|---|---|
| Lithographer's varnish (bodied linseed oil) | 70 |
| Black pigment | 18 |
| Substituted benzene | 10 |
| Dryer (solid metallic derivative) | 2 |

Example 2

| | Parts |
|---|---|
| Rosin | 35 to 50 |
| Substituted benzene | 35 to 25 |
| Pigment | 30 to 25 |

Example 3

| | Parts |
|---|---|
| Gilsonite | 25 |
| Substituted benzene | 50 |
| Varnish (bodied oil or resin-oil combination) | 25 |

(To 100 parts of this combination can be added anywhere from 2 to 20 parts of pigment)

Example 4

| | Parts |
|---|---|
| Varnish (linseed or tung oil combined with resins) | 57 |
| Substituted benzene | 23 |
| Pigment | 18 |
| Dryer | 2 |

Example 5

| | Parts |
|---|---|
| Nitrocellulose | 150 |
| High boiling solvent (amyl lactate or benzyl alcohol) | 50 |
| Substituted benzene | 25 |
| Amyl alcohol | 25 |
| Denatured ethyl alcohol | 325 |
| Lamp black | 50 |

It is understood that the above examples are merely given for the purpose of illustration and that I do not wish to be limited in the interpretation of the scope of my invention except by the sub-joined claims.

I claim:

1. A printing ink comprising a coloring material, a resinous binding material, and a solvent for the binding material consisting of one or more compounds of the class of alkyl substituted benzenes and naphthalenes which boil between 180° C. and 350° C. and are liquid at ordinary temperatures.

2. A printing ink comprising a coloring material, a resin containing binding material, and a solvent for the resin in the binding material consisting of one or more compounds of the class of alkyl substituted benzenes and naphthalenes which boil between 180° C. and 350° C. and are liquid at ordinary temperatures.

3. An ink vehicle consisting of one or more members of the group consisting of resins and asphaltic materials and, as a solvent thinner, one or more compounds of the class of alkyl substituted benzenes and naphthalenes which boil between 180° C. and 350° C. and are liquid at ordinary temperatures.

MELVILLE M. WILSON.